(12) United States Patent
Katano

(10) Patent No.: US 8,228,543 B2
(45) Date of Patent: Jul. 24, 2012

(54) PRINTING SYSTEM AND PRINTING APPARATUS

(75) Inventor: Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/429,087

(22) Filed: Apr. 23, 2009

(65) Prior Publication Data

US 2009/0268242 A1    Oct. 29, 2009

(30) Foreign Application Priority Data

Apr. 23, 2008    (JP) .................... 2008-112754

(51) Int. Cl.
*G06F 15/00* (2006.01)
(52) U.S. Cl. ..................... 358/1.15; 358/1.16
(58) Field of Classification Search .............. None
See application file for complete search history.

(56) References Cited

U.S. PATENT DOCUMENTS

| | | | |
|---|---|---|---|
| 6,957,398 B1* | 10/2005 | Nayeri ............ | 715/867 |
| 8,023,123 B2* | 9/2011 | Tateyama ......... | 358/1.13 |
| 2003/0079134 A1* | 4/2003 | Manchala et al. ... | 713/182 |
| 2003/0142345 A1* | 7/2003 | Bunn et al. ....... | 358/1.15 |
| 2005/0068581 A1* | 3/2005 | Hull et al. ........ | 358/1.16 |
| 2006/0156230 A1* | 7/2006 | Matsubayashi et al. ... | 715/527 |
| 2007/0062388 A1* | 3/2007 | Thomas .......... | 101/211 |
| 2007/0097416 A1* | 5/2007 | Higashimura et al. ... | 358/1.15 |
| 2007/0097435 A1* | 5/2007 | Terajima ........ | 358/1.16 |
| 2008/0120610 A1* | 5/2008 | Katano et al. ..... | 717/168 |

FOREIGN PATENT DOCUMENTS

JP    2007-062111    3/2007

OTHER PUBLICATIONS

Data Coding and Transmission Specification for Digital Broadcasting, Association of Radio Industries and Businesses (ARIB), Mar. 14, 2007.
Operational Guidelines for Digital Terrestrial Television Broadcasting, Association of Radio Industries and Businesses (ARIB), May 29, 2006.
Universal Plug and Play Device Architecture Version 1.0, UPnP Forum, Jul. 20, 2006.
PrintEnhanced:1 Service Template Version 1.01, UPnP Forum, May 4, 2005.

* cited by examiner

*Primary Examiner* — Twyler Haskins
*Assistant Examiner* — Helen Q Zong
(74) *Attorney, Agent, or Firm* — Canon USA Inc. IP Division

(57) ABSTRACT

In a printing system, a first apparatus transmits, to a printing apparatus, a printing instruction containing location information indicating the location of printing content on a network. When receiving the printing instruction, the printing apparatus updates the location information contained in the received printing instruction in accordance with a medium setting indicating a recording medium on which printing is to be performed, and issues a request for printing content corresponding to the updated location information through the network. In response to the request from the printing apparatus, a second apparatus transmits the printing content corresponding to the updated location information to the printing apparatus through the network, and the printing apparatus receives the printing content and performs printing of the printing content on the recording medium. Accordingly, printing content suitable for a printable region of a medium on which printing is to be performed can be easily acquired and printed.

8 Claims, 6 Drawing Sheets

FIG. 4

```
POST /PrintControl HTTP/1.1
Content-Type:text/xml;charset="utf-8"
SOAPAction:"urn:schemas-upnp-orgservice:PrintEnhanced:1 #CreateURIJob"
User-Agent:Vanilla/4.0(compatible; UPnP/1.0;)
Host; 192.168.11.72
Content-Length:1566
Connection: Close
Cache-Control: no-cache
Pragma: no-cache <?xml version="1.0"?>
<s:Envelope xmlns:SOAP-ENV="http//schemas.xmlsoap.org/soap/envelope/"
s:encodingStyle="http://schemas.xmlsoap.org/soap/encoding/">
<s:Body>
<m:CreateURIJob xmlns:m="urn:schemas-upnp-org:service:PrintEnhanced.1">
<JobName xmlns:dt="urn:schemas-microsoft-com:datatypes"dt:dt="string"></JobName>
<JobOriginatingUserName xmlns:dt="urn:schemas-microsoft-com:datatypes"dt:dt="string">
</JobOriginatingUserName>
<DocumentFormat xmlns:dt="urn:schemas-microsoft-com:datatypes"
dt:dt="string">application/x-inettv-xhtml</DocumentFormat>
<Copies xmlns:dt="urn:schemas-microsoft-com:datatypes" dt:dt="14">1</Copies>
<Sides xmlns:dt="urn:schemas-microsoft-com:datatypes" dt:dt="string">device-setting
</Sides>
<NumberUp xmlns:dt="urn:schemas-microsoft-com:datatypes" dt:dt="string">device-
setting</NumberUp>
<OrientationRequested xmlns:dt="urn:schemas-microsoft-com:datatypes"
dt:dt="string">device-setting</OrientationRequested>
<MediaSize xmlns:dt="urn:schemas-microsoft-com:datatypes" dt:dt="string">device-
setting</MediaSize>
<MediaType xmlns:dt="urn:schemas-microsoft-com:datatypes" dt:dt="string">device-
setting</MediaType>
<PrintQuality xmlns:dt="urn:schemas-microsoft-com:datatypes" dt:dt="string">device-
setting</PrintQuality>
<CriticalAttributesList xmlns:dt="urn:schemas-microsoft-com:datatypes"
dt:dt="string">none</CriticalAttributesList>
<Source URI xmlns:dt="urn:schemas-microsoft-com:datatypes" dt:dt="uri">http://
www.serv.com/label.html?disk=yes&dm=12cm&out=11.8cm&in=4.3cm&card=no</SourceURI>
</m:CreateURIJob>
</s:Body>
</s:Envelope>
```

FIG. 5

```
HTTP/1.1 200 OK
CONTENT-LENGTH:320
CONTENT-TYPE:text/xml;charset="utf-8"
Connection: close
EXT:
SERVER: PP-UPnP/1.0

<?xml version="1.0" encoding="utf-8"?>
<s:Envelope s:encodingStyle="http://schemas.xmlsoap.org/soap/encoding/"
xmlns:s="http://schemas.xmlsoap.org/soap/envelope/">
<s:Body>
<u:CreateURIJobResponse xmlns:u="urn:schemas-upnp-orgservice:PrintEnhanced.1">
<JobId>3</JobId>
</u:CreateURIJobResponse>
<s:Body>
</s:Envelope>
```

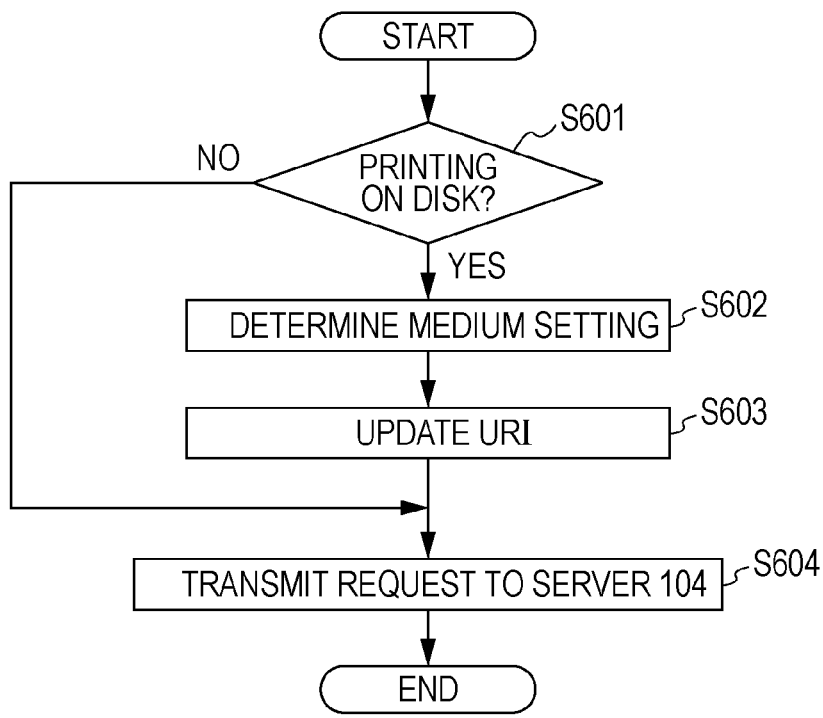

FIG. 6

FIG. 7
(1) http://www.serv.com/label.html?cd=yes&dm=12cm&out=11.8cm&in=4.3cm&card=no
(2) http://www.serv.com/label.html?cd=yes&dm=8cm&out=7.8cm&in=4.3cm&card=no
(3) http://www.serv.com/label.html?cd=yes&im=4.3cm&card=5.6×8.4cm
FIG. 8A
PRIOR ART
FIG. 8B
PRIOR ART
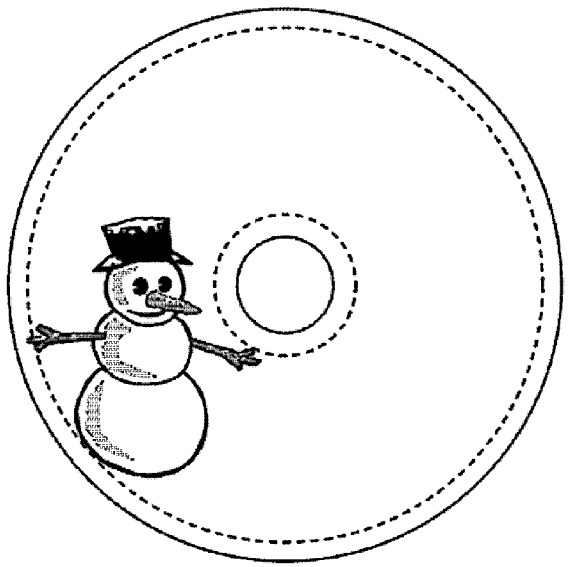
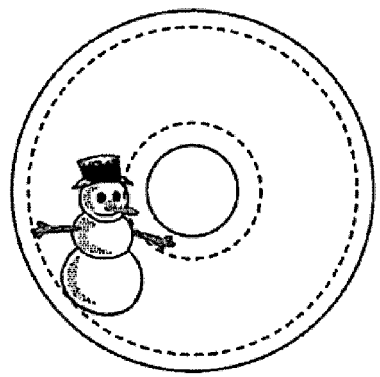

PRINTING SYSTEM AND PRINTING APPARATUS

BACKGROUND OF THE INVENTION

1. Field of the Invention

The present invention relates to a printing apparatus that receives printing content through a network and that performs printing of the received printing content, and more particularly, performing printing on a disk medium.

2. Description of the Related Art

In recent years, due to the developments of digitalization and networking of home electric appliances, digital broadcast television apparatuses (hereinafter, referred to as DTVs) have also realized various functions by transferring data to other apparatuses through networks. For example, a system in which a DTV transfers printing data contained in received broadcast data to a printer through a network and the printer performs printing of the received printing data has been considered. Alternatively, a system in which information indicating the location of printing data on the Internet contained in broadcast data to a printer and the printer acquires the printing data and performs printing of the received printing data has been considered. Such printing systems are defined by "Data Coding and Transmission Specification for Digital Broadcasting" (ARIB STANDARD, Association of Radio Industries and Businesses (ARIB), ARIB STD-B24, Version 5.1) and "OPERATIONAL GUIDELINES FOR DIGITAL TERRESTRIAL TELEVISION BROADCASTING" (ARIB TECHNICAL REPORT, ARIB TR-B14, Version 2.8). Printing related to such data broadcasting will be hereinafter referred to as data broadcast printing.

The data broadcast printing is performed on the basis of PE:1 (PrintEnhanced:1), which is a printing service based on Universal Plug and Play (UPnP) technology. UPnP is a known set of protocols that enables a device connected to a network to be easily found and controlled. In UPnP technology, an apparatus that controls a device is called a control point (CP). In the case of data broadcast printing, a DTV serves as a CP.

PE:1, which is a service of a printer device based on UPnP technology, is defined by "PrintEnhanced:1 Service Template Version 1.01." When a printer is connected to a network to which a DTV is connected, the DTV, which serves as a CP, is capable of detecting the printer. In the PE:1 service, a CreateURIJob action is mainly used as a printing instruction that a DTV issues to a printer. The printing instruction does not contain printing data. The printing instruction contains a uniform resource identifier (URI) serving as location information indicating the location of printing content on the network. When receiving the printing instruction, the printer requests a content server indicated by the URI contained in the printing instruction to transmit content to be printed, and performs printing of the acquired content.

Some printers are capable of performing label printing on disk media, such as CDs and DVDs. Some disk media, such as CDs and DVDs, have a circular shape whose diameter is 8 cm or 12 cm. Furthermore, in recent years, card-shaped CDs have been becoming widely used. As stated above, media having various shapes and various sizes are available. In addition, even for circular-shaped disk media, inner and outer diameters representing a printable region in which printing can be performed may differ from medium to medium. Thus, in the case of label printing on a disk medium, a dedicated application by which an image to be printed can be finely adjusted so as to fit the printable region of the medium is generally used. For example, as a method for printing a piece of content so as to be compatible with various media, a method for changing the size of an image subjected to label printing in accordance with a medium on which printing is to be performed is disclosed in Japanese Patent Laid-Open No. 2007-62111.

Meanwhile, in recent years, since recording of digital broadcasts on disk media, such as DVDs, has been widely performed, performing label printing on a disk medium by using a DTV has been required. That is, the operations of acquiring content from a content server and printing the acquired content on a disk medium, such as a CD or a DVD, have been considered.

However, even in this case, there is a problem in that printing must be performed so as to fit a printable region of a medium, as described above. Under such circumstances, a method for adjusting content to be printed can be considered, as described in Japanese Patent Laid-Open No. 2007-62111. However, according to this method, in a printed image, image balance may be degraded or an important portion of the image may be lost. FIG. 8A is an illustration showing an example of printing content to be printed on a disk medium. In a case where the printing content shown in FIG. 8A is printed on a disk medium, a region encircled by dotted lines represents a printable region. FIG. 8B is an illustration showing an example of the printing content adjusted by the method described in the prior art. The printing content shown in FIG. 8B is generated by reducing the printing content shown in FIG. 8A. Although the outer diameters of the printable regions shown in FIGS. 8A and 8B differ from each other, the inner diameters of the printable regions shown in FIGS. 8A and 8B are the same. Thus, in a case where, as in the technology described in Japanese Patent Laid-Open No. 2007-62111, the size of the printing content shown in FIG. 8A is reduced and the reduced printing content is printed within the printable region shown in FIG. 8B, part of an image of an object exists outside the printable region. In particular, in a system in which charged content is printed in data broadcast printing, a situation in which acquired content does not fit the printable region of a medium on which the content is to be printed causes a serious problem.

Thus, in a case where, in particular, data broadcast printing is performed on a medium having a printable region similar to that of a disk medium, it is desirable that a content server store a plurality of pieces of dedicated printing content suitable for media on which printing is to be performed and that a printer acquire a corresponding piece of printing content and print the acquired printing content. Thus, in order to acquire the dedicated printing content, it is necessary to transfer, from the printer to the content server, medium setting information indicating the shape, size, and the like of a medium on which printing is to be performed. However, according to the current standards of data broadcast printing, medium setting information cannot be transferred directly from a printer to a content server. Thus, in order to transfer medium setting information to a content server, a DTV needs to acquire medium setting information of a printer and to transmit the acquired medium setting information to the content server. In this method, however, the DTV needs to perform communications a large number of times. Thus, a large amount of load will be imposed on the DTV.

SUMMARY OF THE INVENTION

An embodiment of the present invention provides a printing system that easily acquires printing content suitable for a printable region of a medium and that performs printing of the acquired printing content on the medium.

According to an aspect of the present invention, there is provided a printing system including a first apparatus configured to issue a printing instruction; a second apparatus configured to transmit printing content; and a printing apparatus configured to receive the printing content and to perform printing of the printing content. The first apparatus and the second apparatus are connected to the printing apparatus. The first apparatus includes a first transmission unit configured to transmit, to the printing apparatus, a printing instruction containing location information indicating the location of printing content on a network. The printing apparatus includes a requesting unit configured to determine a medium setting indicating a recording medium on which printing is to be performed, update, in accordance with the determined medium setting, the location information contained in the printing instruction transmitted from the first transmission unit, and issue a request for printing content through the network in accordance with the updated location information. The second apparatus includes a second transmission unit configured to transmit, in response to the request from the requesting unit, the printing content corresponding to the updated location information to the printing apparatus through the network. The printing apparatus receives the printing content transmitted from the second transmission unit and prints the received printing content on the recording medium.

Further features of the present invention will become apparent from the following description of exemplary embodiments with reference to the attached drawings.

BRIEF DESCRIPTION OF THE DRAWINGS

FIG. 4 is an illustration showing an example of a CreateURIJob Request.

FIG. 5 is an illustration showing an example of a CreateURIJob Response.

FIG. 6 is a flowchart showing a process performed by the printer according to the embodiment when receiving a printing instruction.

FIG. 7 is an illustration showing an example of a SourceURI.

FIG. 8A is an illustration showing an example of printing content to be printed on a disk medium.

FIG. 8B is an illustration showing an example of the printing content adjusted by the method described in the prior art.

DESCRIPTION OF THE EMBODIMENTS

Figure 1:
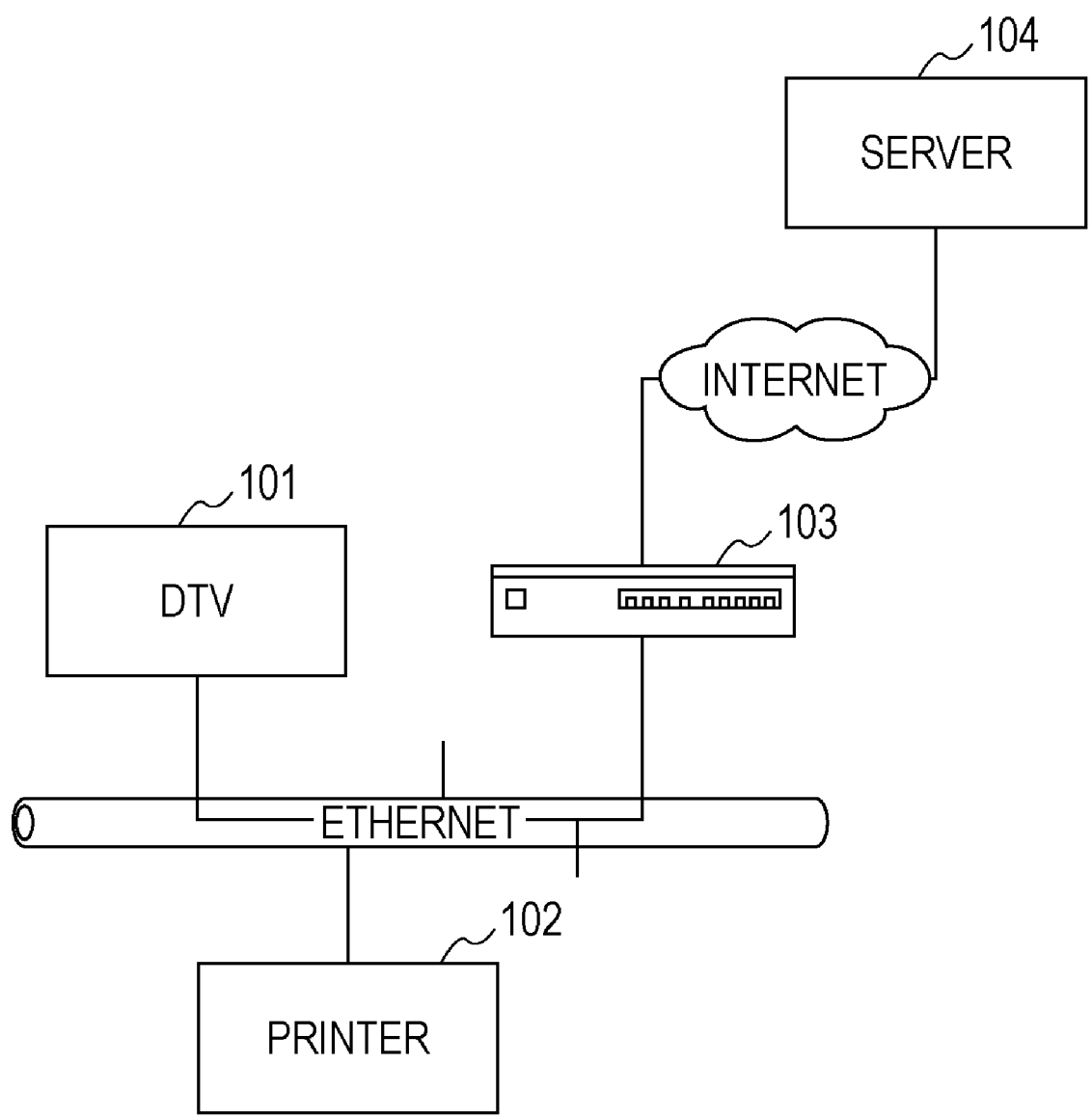
FIG. 1 is an illustration showing an example of a network configuration according to an embodiment of the present invention.

FIG. 1 is an illustration showing an example of a network configuration according to an embodiment of the present invention. Referring to FIG. 1, a digital television (DTV) 101 and a printer 102 are connected to an Ethernet network and are capable of communicating with each other through the Ethernet network. Similarly, a router 103 is also connected to the Ethernet network and is capable of communicating with the printer 102. A server 104 is a Hypertext Transfer Protocol (HTTP) server and is capable of implementing Transmission Control Protocol/Internet Protocol (TCP/IP)-based communications with the router 103 through the Internet. With this configuration, the printer 102 is capable of communicating with the server 104 through the router 103.

Figure 2:
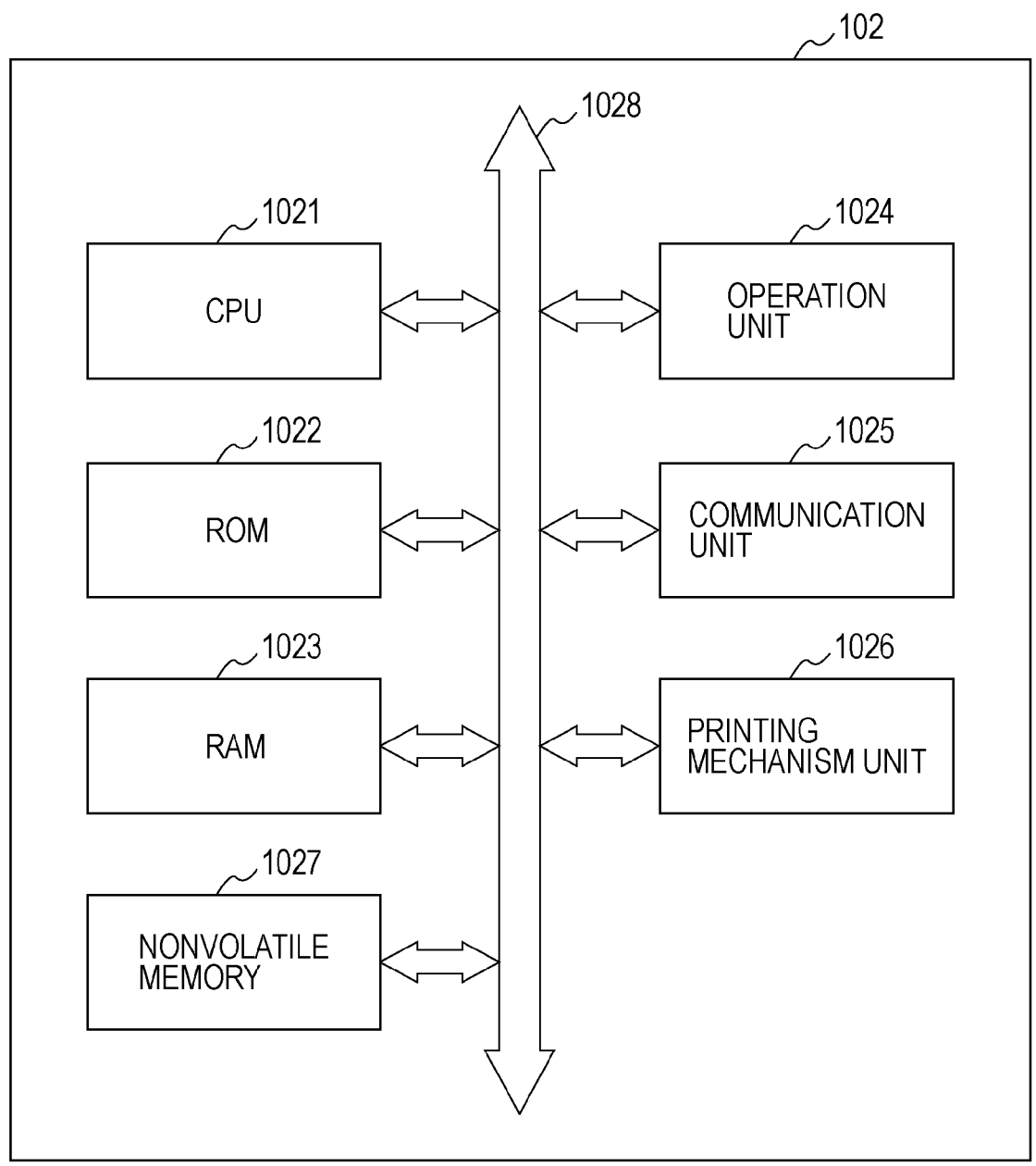
FIG. 2 is an illustration showing a main configuration of a printer according to the embodiment.

FIG. 2 is an illustration showing a main configuration of the printer 102 according to this embodiment. Referring to FIG. 2, a central processing unit (CPU) 1021, a read-only memory (ROM) 1022, a random-access memory (RAM) 1023, an operation unit 1024, a communication unit 1025, a printing mechanism unit 1026, and a nonvolatile memory 1027 are connected to each other through a system bus 1028.

The CPU 1021 controls the entire printer 102. The CPU 1021 controls the operation unit 1024, the communication unit 1025, and the printing mechanism unit 1026, while using the RAM 1023 as a work memory, on the basis of a program stored in the ROM 1022. The nonvolatile memory 1027 retains stored information even when the power is turned off. The nonvolatile memory 1027 is used for storing setting information and the like of the printer 102. Although not illustrated, the operation unit 1024 serves as a user interface of the printer 102 and includes an operation button serving as an input section and a liquid crystal panel serving as a display section. A user operates the button, while viewing the display on the liquid crystal panel, to perform setting or changing of medium settings, such as the type of a recording medium on which printing is to be performed, the shape of the recording medium, such as a circular shape or a card shape, and the size of the recording medium. The medium setting information set by the user is stored in the nonvolatile memory 1027. The communication unit 1025 is connected to the Ethernet network to communicate with the DTV 101 and the router 103. As described above, the printer 102 is capable of implementing UPnP communications with the DTV and implementing HTTP communications with a content server through the router 103. The printing mechanism unit 1026 is a mechanism for implementing printing and outputting. The printing mechanism unit 1026 performs recording on a recording medium. In particular, in a case where printing is performed on a disk medium such as a CD or a DVD, a dedicated tray on which the disk medium is installed is conveyed to the printing mechanism unit 1026 so that printing is performed on the disk medium.

Figure 3:
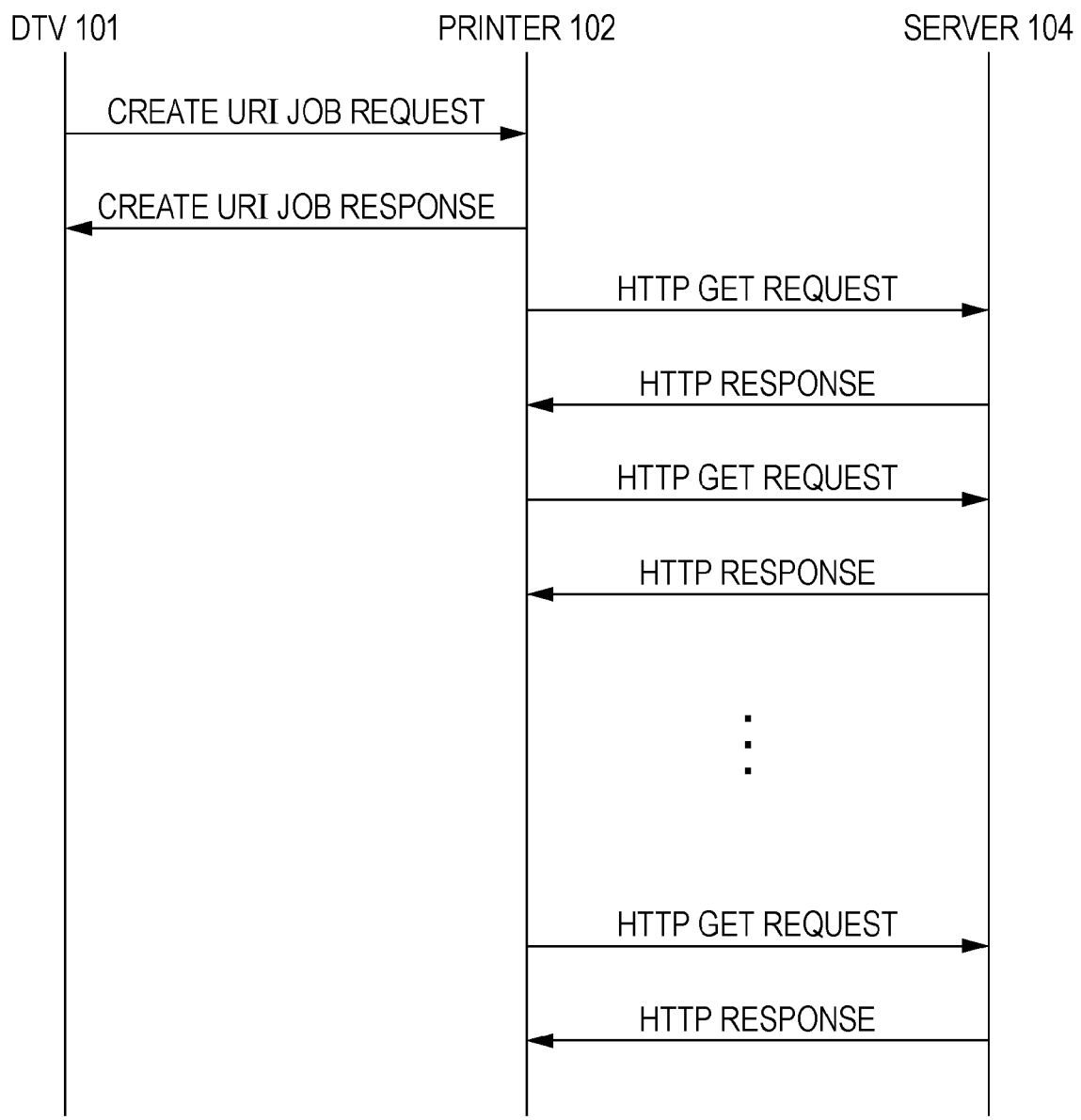
FIG. 3 is an illustration showing a communication sequence among a DTV, a printer, and a server.

FIG. 3 is an illustration showing a communication sequence among the DTV, the printer, and the server in the network configuration shown in FIG. 1. Note that in this illustration, the DTV 101 is an apparatus that is capable of receiving data broadcast content and communications between the DTV 101 and the printer 102 are based on UPnP and PE:1 services described above. Thus, the DTV 101, which serves as a first apparatus, transmits a printing instruction (CreateURIJob) contained in the received data broadcast content to the printer 102. In addition, the server 104, which serves as a second apparatus, stores printing content and transmits the stored printing content.

Referring to FIG. 3, first, the DTV 101 issues a CreateURIJob Request, which is a printing instruction, to the printer 102. When receiving the CreateURIJob Request, in a case where printing can be performed, the printer 102 generates a print job and transmits a CreateURIJob Response to the DTV 101. When receiving the CreateURIJob Response, the DTV 101 understands the fact that the printing instruction has been received by the printer 102 and the print job has been generated.

In accordance with a URI contained in the received CreateURIJob Request, the printer 102 transmits a Request to the server 104 in accordance with an HTTP GET method. By transmitting the Request, the printer 102 is capable of requesting the server 104 to transmit a file.

When receiving the Request, the server 104 transmits, as an HTTP Response, an Extensible HyperText Markup Language (XHTML)-Print file, which is printing content, to the printer 102, in accordance with the URI contained in the Request. This transmission may be called second transmission. Note that XHTML-Print is a markup language defined for printing and conforms to the standards cited in "PrintEnhanced:1 Service Template Version 1.01". Thus, XHTML-Print will not be described here in detail.

The printer 102 interprets the received XHTML-Print file. In a case where a style sheet, an image, or the like is referred to in the received XHTML-Print file, the printer 102 further obtains the style sheet, the image, or the like by using the HTTP GET method. The printer 102 converts the printing content into data to be printed, and performs printing by using the printing mechanism unit 1026.

FIG. 4 is an illustration showing an example of the CreateURIJob Request described with reference to FIG. 3. Referring to FIG. 4, a parameter SourceURI in the CreateURIJob is a parameter in which the URI of printing content is stored and indicates the location of the printing content on the Internet.

FIG. 5 is an illustration showing an example of the CreateURIJob Response. The value of a parameter JobId in this illustration is an ID that identifies a generated print job. When receiving the ID, the DTV 101 is capable of understanding the fact that the issued Request has been received by the printer 102 and the print job has been generated. Note that, in the case of cancelling the job, the DTV 101 specifies the ID and transmits a CancelJob Request to the printer 102.

FIG. 6 is a flowchart showing a process performed by the printer 102 according to this embodiment when receiving a CreateURIJob Request, which is a printing instruction. Note that a plurality of pieces of printing content corresponding to various types and sizes of media on which printing is to be performed are stored in the server 104 according to this embodiment and URIs corresponding to the individual pieces of printing content are set. Referring to FIG. 6, in step S601, the printer 102 determines whether or not printing on a disk medium is to be performed. In a case where the printer 102 determines that printing on a disk medium is to be performed (YES in step S601), the printer 102 determines medium settings in step S602. Then, in step S603, the printer 102 updates the received SourceURI in accordance with the determined medium settings. In step S604, the printer 102 transmits a Request to the server 104 in accordance with the SourceURI. As described above, in a case where the printer 102 determines in step S601 that printing on a disk medium is to be performed (YES in step S601), the printer 102 transmits the Request in accordance with the URI updated in accordance with the medium settings. Meanwhile, in a case where the printer 102 determines in step S601 that printing on a disk medium is not to be performed (NO in step S601), the printer 102 transmits a Request to the server 104 in accordance with the URI received from the DTV 101.

In the process shown in FIG. 6, the printer 102 updates an URI in accordance with medium settings in step S603. A plurality of pieces of printing content corresponding to various media are stored in the server 104 and URIs corresponding to the individual pieces of printing content are set. In addition, as described above with reference to FIG. 3, the server 104 transmits printing content in accordance with an URI contained in a received Request. Thus, by updating the SourceURI, the printer 102 is capable of changing printing content to be acquired from the server 104. Hence, since the printer 102 is capable of acquiring printing content suitable for medium settings only by updating the SourceURI in accordance with the URI set by the server, the printer 102 is capable of performing printing of printing content suitable for a medium on which printing is to be performed.

Note that, in step S602, the printer 102 is capable of determining medium settings by reading medium setting information stored in the nonvolatile memory 1027. Alternatively, for example, in a case where a function of automatically determining a medium conveyed to the printing mechanism unit 1026 is provided, the printer 102 may determine medium settings in accordance with a result obtained by the automatic determination. In this example, a plurality of pieces of printing content corresponding to various types and sizes of media are stored in the server 104 and URIs corresponding to the individual pieces of printing content are set. However, the present invention is not limited to this. The server 104 may determine medium settings in accordance with a designated URI and dynamically generate printing content.

FIG. 7 is an illustration showing examples of the SourceURI described above. In this embodiment, a URI query part, "cd=yes", which is located after the question mark "?" in a URI, indicates printing on a disk medium. By checking the URI query, the printer 102 is capable of determining whether printing on a disk medium is to be performed. Alternatively, control may be performed in such a manner that a specific URI query is provided to the URI in the case of printing on a disk medium and the specific URI query is not provided to the URI in the case of printing on other types of media. In addition, concerning other URI queries of a SourceURI (1) in FIG. 7, a URI query "dm=12 cm" indicates that the diameter of the disk medium is 12 cm, a URI query "out=11.8 cm" indicates that the outer diameter of the disk medium is 11.8 cm, a URI query "in =4.3 cm" indicates that the inner diameter of the disk medium is 4.3 cm, and a URI query "card=no" indicates that the disk medium is not card-shaped but circular shaped. Similarly, a SourceURI (2) in FIG. 7 indicates that a disk medium is a circular-shaped medium having a diameter of 8 cm, an outer diameter of 7.8 cm, and an inner diameter of 4.3 cm. In addition, a SourceURI (3) in FIG. 7 indicates that a disk medium is a card-shaped medium having an inner diameter of 4.3 cm and an area of 5.6 cm×8.4 cm.

In step S603 of FIG. 6, in accordance with the medium settings determined in step S602, the printer 102 can rewrite the SourceURI, regarding whether or not the medium is card-shaped, or rewrite the values of the outer diameter and inner diameter of the medium. Accordingly, printing content stored in the server 104 can be specified. Thus, the printer 102 is capable of acquiring and printing content suitable for the medium. In addition, for example, in the case of updating from the URI corresponding to the card-shaped medium indicated by the SourceURI (3) of FIG. 7 to the URI corresponding to the circular-shaped medium indicated by the SourceURI (1) or (2) of FIG. 7, URI queries regarding diameter and outer diameter can be added. On the contrary, in the case of updating from a URI corresponding to a circular-shaped medium to a URI corresponding to a card-shaped medium, URI queries regarding diameter and outer diameters can be deleted.

In the above description, medium settings used in this embodiment are related to the size and shape of a disk medium. However, medium settings are not necessarily related to the size and shape of a disk medium. Medium settings may be widely related to characteristics of a recording medium. For example, medium settings may be related to the aspect ratio of paper on which printing is to be performed. Alternatively, when there are a plurality of pieces of paper of different colors on which printing is to be performed, the present invention may be applied to a case where content should be changed according to the color. In addition, although the present invention is applied to data broadcast printing in this embodiment, the present invention is not necessarily limited to data broadcast printing. For example, the present invention may be applied to a case where a subject that issues a printing instruction is not a DTV but a game machine and the URI of printing content stored in game software is transmitted to a printer so that printing is performed. In addition, in this embodiment, a DTV transmits a printing instruction containing a URI to a printer through the Ethernet network. However, the present invention is not limited to this. For example, a cellular phone or a personal digital assistant (PDA) may transmit a printing instruction containing a URI to a printer by using Bluetooth®. Transmitting a printing instruction containing a URI using Bluetooth is defined by Print-By-Reference, which is one of the specifications of a basic print profile. According to the Print-By-Reference, a portable terminal is capable of transmitting a printing instruction containing location information of printing content to a printer.

Although the present invention is applied to a UPnP PrintEnhanced:1 service in this embodiment, the present invention is not limited to the PrintEnhanced:1 service. For example, instead of the PrintEnhanced:1 service, a service dedicated to disk label printing may be newly defined. A service may be started when a tray used for printing on a disk medium is inserted in a printer, and the service may be ended when printing is completed. In addition, a service may be retrieved when a DTV performs label printing on a disk medium, and printing may be started when the started service is found. In this case, the DTV is capable of easily determining whether or not label printing can be performed.

In addition, although a configuration in which a content server (server 104) receives a request for printing content and transmits the printing content is described in this embodiment, the present invention is not limited to this. For example, when receiving a request for printing content from a printer, a server may transmit to the printer the URI of a server from which the printing content is to be actually transmitted. Alternatively, a configuration in which a plurality of servers that transmit printing content exist and a server that transmits printing content is dynamically changed in accordance with domain name system (DNS) round robin or the like may be used.

An aspect of the present invention can also be achieved by supplying a recording medium on which program code implementing functions of the above-described embodiments is recorded to a system or an apparatus and performing the program code by a computer (or a CPU or a microprocessing unit (MPU)) of the system or the apparatus. In this case, the program code read from the recording medium attains the functions of the embodiments described above. The recording medium on which the program code is recorded is included in the present invention. For example, a hard disk, a CD-ROM, a CD-R, a nonvolatile memory card, a ROM, a DVD, or the like can be used as a recording medium for supplying the program code. An aspect of the present invention can also be achieved when part or all of the actual processing is performed by an operating system (OS) or the like running on the computer on the basis of instructions of the program code and the functions of the embodiments described above are attained. Furthermore, an aspect of the present invention can also be achieved when the program code attaining the functions of the embodiments described above are written to a memory arranged in a function expansion board inserted in the computer or a function expansion unit connected to the computer. In this case, the functions of the embodiments described above can also be attained when part or all of the actual processing is performed by a CPU or the like arranged in the function expansion board or the function expansion unit on the basis of instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-112754 filed Apr. 23, 2008, which is hereby incorporated by reference herein in its entirety.

What is claimed is:

1. A printing control apparatus comprising:
   an acquiring unit configured to acquire information indicating a location in which a print content is stored;
   a determining unit configured to determine a size of a print medium on which an image based on the print content is printed;
   a generating unit configured to generate, based on the information acquired by the acquiring unit and the determined size of the print medium determined by the determining unit, specifying information for specifying the print content stored in the location and the determined size of the print medium;
   a requesting unit configured to request the print content corresponding to the determined size of the print medium to an external apparatus of the printing control apparatus, by accessing to an access destination corresponding to the external apparatus according to the specifying information generated by the generating unit;
   wherein the external apparatus stores a plurality of print contents corresponding to a plurality of sizes of print media, and the requesting unit requests a print content corresponding to the determined size of the print medium in the plurality of print contents; and
   a print control unit configured to cause a printing apparatus to print an image based on a print content which is transmitted by the external apparatus in response to the request by the requesting unit.

2. The printing control apparatus according to claim 1, wherein the requesting unit requests, by accessing the access destination corresponding to the external apparatus, the external apparatus to generate a print content corresponding to the determined size of the print medium.

3. The printing control apparatus according to claim 1, wherein the information acquired by the acquiring unit includes a uniform resource identifier, and the generating unit updates the uniform resource identifier according to the determined size of the print medium.

4. The printing control apparatus according to claim 1, wherein the determining unit determines the shape of the print medium.

5. The printing control apparatus according to claim 1, wherein the determining unit determines the size of the print medium according to a print setting designated by a user.

6. The printing control apparatus according to claim 1, wherein the determining unit determines the size of the print medium, by detecting the print medium which the printing apparatus has.

7. A method for printing control of a computer including at least one processor communicatively-coupled to a memory via a bus, comprising:
   acquiring information indicating a location in which a print content is stored;

determining a size of a print medium on which an image based on the print content is printed;

generating specifying information for specifying the print content stored in the location and the determined size of the print medium, based on the acquired information and the determined size;

requesting a print content corresponding to the determined size of the print medium to an external apparatus of the print control apparatus, by accessing an access destination corresponding to the external apparatus according to the specifying information, wherein the external apparatus stores a plurality of print contents corresponding to a plurality of sizes of print media, and the requesting unit requests a print content corresponding to the determined size of the print medium in the plurality of print contents; and causing a printing apparatus to print an image based on a print content which is transmitted by the external apparatus in response to the request unit.

8. A non-transitory computer-readable storage medium storing a program causing a computer to perform the printing control method according to claim 7.

* * * * *